H. N. KILBY.
FILTER CLEANING DEVICE.
APPLICATION FILED JAN. 16, 1915.
1,169,725.
Patented Jan. 25, 1916.
2 SHEETS—SHEET 2.
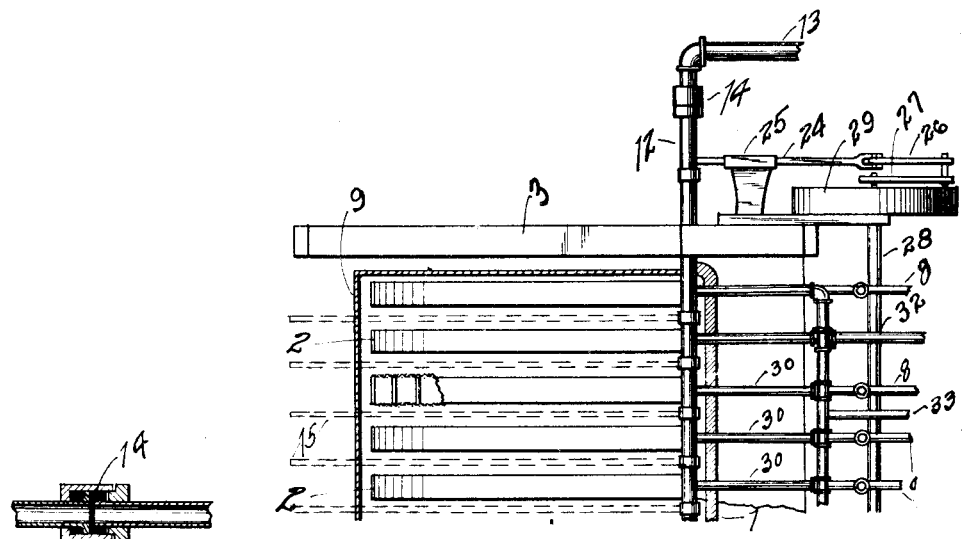
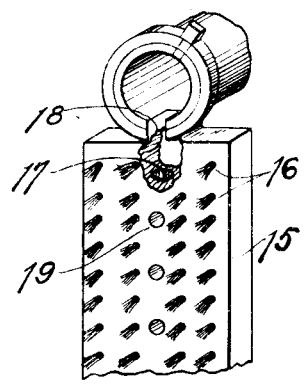
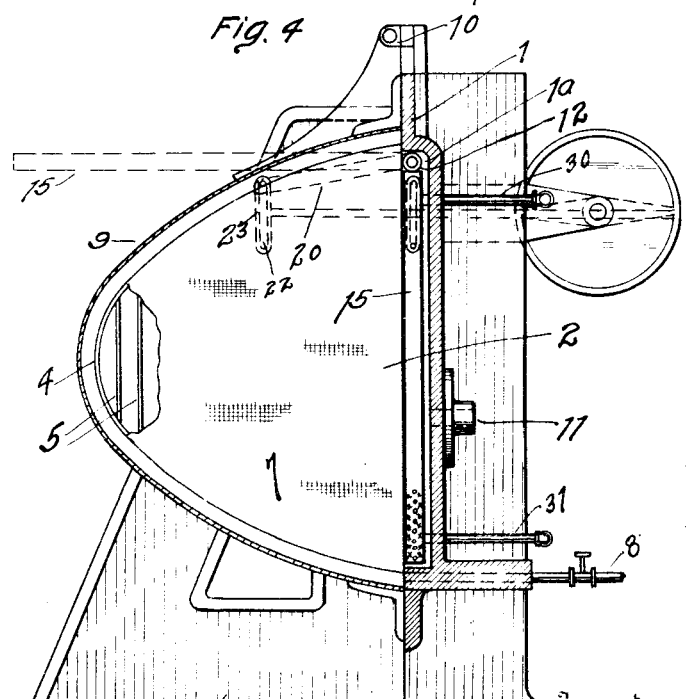
Witnesses
J. C. Merkle
A. L. Phelps
Inventor
Herbert N. Kilby
By
C. C. Shepherd Attorney

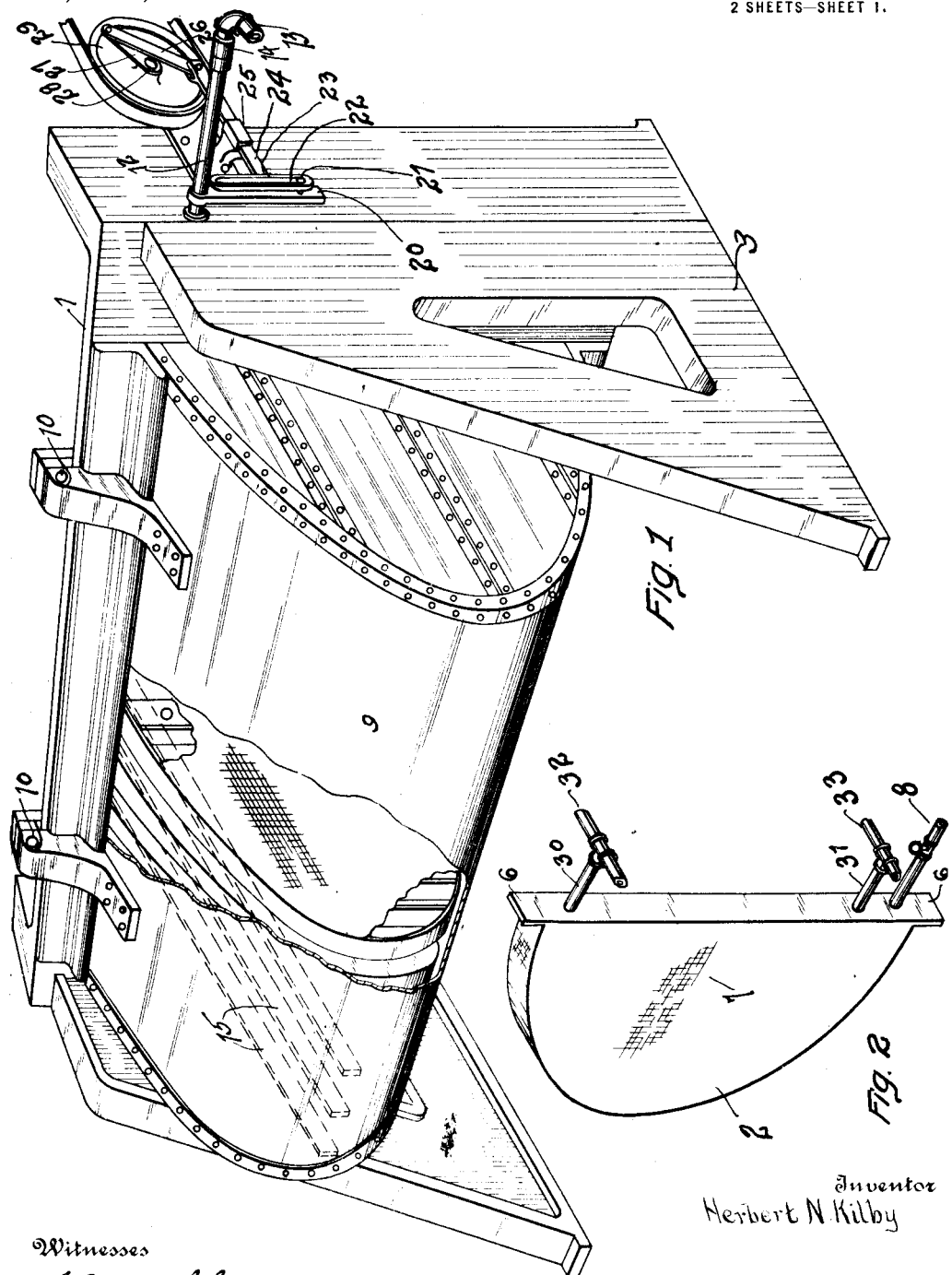

UNITED STATES PATENT OFFICE.

HERBERT N. KILBY, OF CLEVELAND, OHIO.

FILTER-CLEANING DEVICE.

1,169,725.

Specification of Letters Patent.  Patented Jan. 25, 1916.

Application filed January 16, 1915. Serial No. 2,743.

*To all whom it may concern:*

Be it known that I, HERBERT N. KILBY, a citizen of the United States, residing at Cleveland, in the county of Cuyahoga and State of Ohio, have invented certain new and useful Improvements in Filter-Cleaning Devices, of which the following is a specification.

My invention relates to filter cleaning devices and has general application to all types of filters wherein pulp is designed to be separated from the juices, but has special application to those filters associated with the sugar industry.

In filtering various liquids, a cake or deposit is usually left upon the various filter elements and at times, depending upon the liquid being filtered, this cake or deposit is of a gummy nature. This residue then not only stops up the pores for permitting the ready filtering of the liquid, but it is also somewhat difficult of removal.

My invention contemplates the provision of a cleaning structure whereby this cake or residue may be readily removed. In this connection, my invention also resides in so arranging the various parts that the removal of this cake may be effected without changing the normal relative arrangement of the filter plates themselves with respect to each other.

Another object of my invention resides in the provision of peculiarly novel means for spraying the various filter plates with streams of water, this water being directed by means of a structure whereby the streams themselves may be given such movement to play over the entire filtering surfaces.

My invention also resides in the combination of a plurality of cleaning devices so arranged to have cleaning movement over the various filter plates and means for inflating the filter elements themselves, where these elements are of an inflatable nature, whereby they are puffed out to more readily facilitate the cleaning operation.

Still a further object of my invention resides in the provision of means whereby the interior of all of the filter elements may be slushed or cleaned whenever desired.

Another object resides in the peculiar type of brush or cleaning member used by me wherein this cleaning member is of a hollow nature carried by and in communication with a rotatably mounted water supply pipe, whereby the filter elements are simultaneously sprayed and cleaned by the same movement and by the same mechanism.

Other objects of my invention will appear after a detailed description of the accompanying sheets of drawings, which represent the preferred embodiment of my invention.

In these drawings, similar characters of reference designate corresponding parts, and, Figure 1 shows my device as applied to a well known type of filter, the structure being shown in perspective, Fig. 2 is a detail view in perspective of one of the filter elements and its connections, Fig. 3 is a view in cross section through the structure shown in Fig. 1, Fig. 4 is a top plan view of a portion of the structure shown in Fig. 3, the inclosing hood being shown in section, Fig. 5 is a detail view in perspective of a portion of one cleaner element, and, Fig. 6 is a detail view of one form of pipe connection used by me.

In these drawings, 1 represents a back plate provided with a horizontally extending depressed portion 1ª, the various filter elements 2 being preferably vertically disposed and supported from this back plate, which in turn is supported upon end standards 3. The filters 2 are provided in any desired number and are all slightly spaced with respect to each other, being formed of a general outer framework 4 carrying a plurality of vertically disposed cross members 5 at suitable intervals, the members 4 terminating at their upper and lower ends, as shown at 6, to form a means of attachment to the back plate. Over the framework of each filter element is placed a fabric covering 7 of any preferred type, which allows the juices to enter the interior of the various filter elements and discharge them through the valve controlled outlet pipe, as shown at 8, each of the pipes 8 being in communication with their corresponding filter elements. All of the filter elements are suitably housed or incased within a semi-oval housing or casing member shown at 9, this casing member being pivoted adjacent its upper edge, as shown at 10. The juices to be filtered, enter the casing structure through the inlet shown at 11 and by internal pressure within the casing, they filter through the various filter elements and then pass out through the outlet pipes 8, leaving whatever solid matter they may contain in the nature of a deposit, upon the various filter elements. At times, this deposit may be removed by a simple spraying action and in order that this may be accomplished very readily, I have provided a pipe 12 located in the upper corner of the depressed portion 1ª of the back plate and extending the full length of the arrangement of filter plates. This pipe is rotatably supported in any desired manner and is located in the depressed portion 1ª in order that the hood member 9 may be readily swung about its pivot point without interfering with its operation. As is shown particularly plain in Figs. 4 and 6, this pipe connects with a service pipe 13 by means of the packed union designated generally at 14 whereby the portion 12 is rotatable and still maintains its communication with the pipe 13. This pipe 12 is provided at repeated intervals between the various filter elements with a member 15 of the brush or squeegee type as is shown in Fig. 5, from which it will be seen that the brush itself carries a plurality of bristles 16 and is held, as shown at 17, to be in communication with the water pipe 12 through the apertures shown at 18. Also, each brush member is provided with a longitudinally arranged series of outlet apertures 19, from which it will be apparent that rotary movement of the pipe 12 will cause a spraying of water over the surfaces of the various filter elements by means of the mechanism just described. Preferably, mechanism is provided whereby this spraying action may be accomplished mechanically rather than by manual operation, and this mechanism I have shown as comprising an operating rod 20 rigidly carried by the pipe 12 at each end outside of the back plate 1, each of these operating rods being provided with a laterally projecting pin 21. Each of these pins is designed to operate within the slotted portion 22 of the operating head 23 carried upon one end of the piston shown at 24. Each of the pistons 24 is slidably mounted in the bearing member shown at 25 and is pivotally connected through the medium of a connecting link 26 with an operating crank 27 rigidly carried upon the operating shaft 28, this latter receiving its rotary motion by means of a pulley 29 deriving power from any desired source. It will thus be apparent that rotation of the shaft 28 will impart an oscillatory movement to the water pipe 12 through the pin and slot connection shown at 21 and 22, whereby the sprays or streams passing through the apertures 19 in each of the brush members 15 may be directed over the entire filtering surfaces of the various filter elements, it being understood that the hood 9 has been previously elevated to expose all of the filter elements to view. Further, by the provision of the bristles 16, the filtering surfaces of each of the filter elements may be scrubbed simultaneously with their spraying action. This latter arrangement is particularly desirable in case the deposit is of a gummy nature and, therefore, of necessity not readily removable.

In order to further facilitate the cleaning and scrubbing of the exterior of each of the filter elements, as well as also cleaning or slushing their interior, I have provided a series of inlet connections 30 to each of the filter elements and outlet connections 31. These inlet and outlet connections communicate with valve controlled supply and return pipes 32 and 33 respectively, whereby it will be apparent that by closing the outlet pipe 33, each of the filter elements may be inflated with any convenient fluid at hand. This inflation will cause a puffing out of the cloths usually surrounding the filter elements and will, therefore, make the scrubbing action more effective. In case it is then desired to slush the interior of the filter elements, the valve control of the outlet pipe 33 may be opened to allow a free circulation of the cleaning fluid through each of the filter elements, it being understood that the juice outlets 8 are all preferably closed during this operation.

By the structure just described, the cloths forming a portion of the various filter elements may be bulged outwardly to insure a more perfect contact between the cleaning structures as they are given movement over the filter surfaces. Further, it will be apparent that I have provided a structure whereby these filter plates may be very effectively cleaned both interiorly and exteriorly, no matter what the nature of the deposit or juice may be. Also, by the peculiar location of the water spraying and cleaning structure in the upper portion of the depressed portion 1ª of the back plate 1, the housing may be elevated to expose the entire surface of the various filter elements to permit a ready inspection of their condition.

What I claim, is:

1. In a filter, an inclosing casing structure, a plurality of spaced filter plates supported therein, a plurality of suitably supported cleaner members movable over the filtering surfaces of said plates and out from a position between them when not in use, and means for imparting cleaning movement to said members.

2. In a filter, an inclosing casing structure, a plurality of filter plates supported therein, a plurality of spray devices movable over the filtering surfaces of said plates, supporting means attached to one end of each of said devices, said means being arranged beyond the edges of the plates to avoid passage through the plates, and means for imparting swinging movement to said devices.

3. In a filter, an inclosing casing structure, a plurality of spaced filter plates supported therein, a rotatably mounted pipe extending the length of said casing, means for spraying a series of streams of water from said pipe over said plates, a plurality of brushes rigidly carried by said pipe, means for oscillating said pipe, and means for inflating said plates.

4. In a filter, an inclosing casing structure, a plurality of spaced filter plates supported therein, a rotatably mounted water pipe extending the length of said casing, means for spraying a series of streams of water from said pipe on said plates, a plurality of cleaner devices rigidly carried by said pipe, and means for oscillating said pipe.

5. In a filter, an upright back plate, a semi-oval casing fitting against said plate, a plurality of spaced filter plates within said casing, said casing being pivotally mounted at its upper end adjacent said back, a rotatably mounted water pipe supported in the upper portion of said casing directly adjacent said plate, means for spraying a series of streams of water from said pipe on said filter plates, a plurality of cleaner devices rigidly carried by said pipe, and means for oscillating said pipe.

6. In a filter, an upright back plate, a semi-oval casing fitting against said plate, a plurality of spaced filter plates carried by said plate, said back plate being formed with a depressed portion, a rotatable element journaled in said depressed portion, and a plurality of brush members rigidly carried by said element and movable over the exterior of said filter plates.

7. In a filter, an upright back plate, a semi-oval casing fitting against said plate, a plurality of spaced filter plates carried by said plate, said back plate being formed with a depressed portion, a rotatable water pipe journaled in said depressed portion, and a plurality of hollow brush members carried by and in communication with said pipe and movable over the exterior of said filter plates.

8. In a filter, a plurality of spaced filter plates, an inclosing casing for said plates, a valve controlled outlet pipe leading from the interior of each plate through said casing, inlet pipes leading to the spaces between said plates, and fluid inlet pipes leading to the interior of said plates whereby they may be either inflated or flushed.

9. In a filter, a plurality of spaced filter plates, and a plurality of hollow brush elements provided with a series of apertures arranged to play over the outer surfaces of said plates, said brushes being connected to a source of water supply.

10. In a filter, a plurality of spaced filter plates, a water pipe extending longitudinally of the filter and rotatably mounted therein, and a plurality of hollow brush members rigidly carried by and in communication with said pipe arranged to play over the outer surfaces of said plates, said members being formed with a series of spray apertures.

11. In a filter, an inclosing casing structure, a plurality of spaced filter plates supported therein, a plurality of elongated cleaner members movable over the filtering surface of said plates, supporting means attached to one end of each of said members, said means being arranged beyond the edges of the plates to avoid passage through said plates, and means for imparting cleaning movement to said members.

12. In a filter, an inclosing casing structure, a plurality of spaced filter plates supported therein, a plurality of cleaner members movable over the filtering surfaces of said plates, supporting means for each of said members arranged within said casing beyond the edges of the plates to avoid passage through said plates, and means for imparting cleaning movement to said members.

13. In a filter, an inclosing casing structure, a plurality of spaced filter plates supported therein, a plurality of cleaner members movable over the filtering surfaces of said plates, means for supporting each of said members out to one side of said plates, and means for imparting cleaning movement to said members.

14. In a filter, an inclosing casing structure, a plurality of spaced filter plates supported therein, a plurality of cleaner members movable over the filtering surfaces of said members, and a rotatable element to which said members are attached, said element being mounted within said casing and out to one side of said plates.

In testimony whereof I affix my signature in presence of two witnesses.

HERBERT N. KILBY.

Witnesses:
  STERLING NEWELL,
  G. M. BREEN.